Aug. 24, 1948.  T. A. DALY  2,447,639
TORPEDO BATTERY COMPARTMENT
Filed Nov. 30, 1946  4 Sheets-Sheet 1

WITNESSES:
Edward Michaels
E. H. Oberhein

INVENTOR
Thomas A. Daly.
BY
Paul E. Friedemann
ATTORNEY

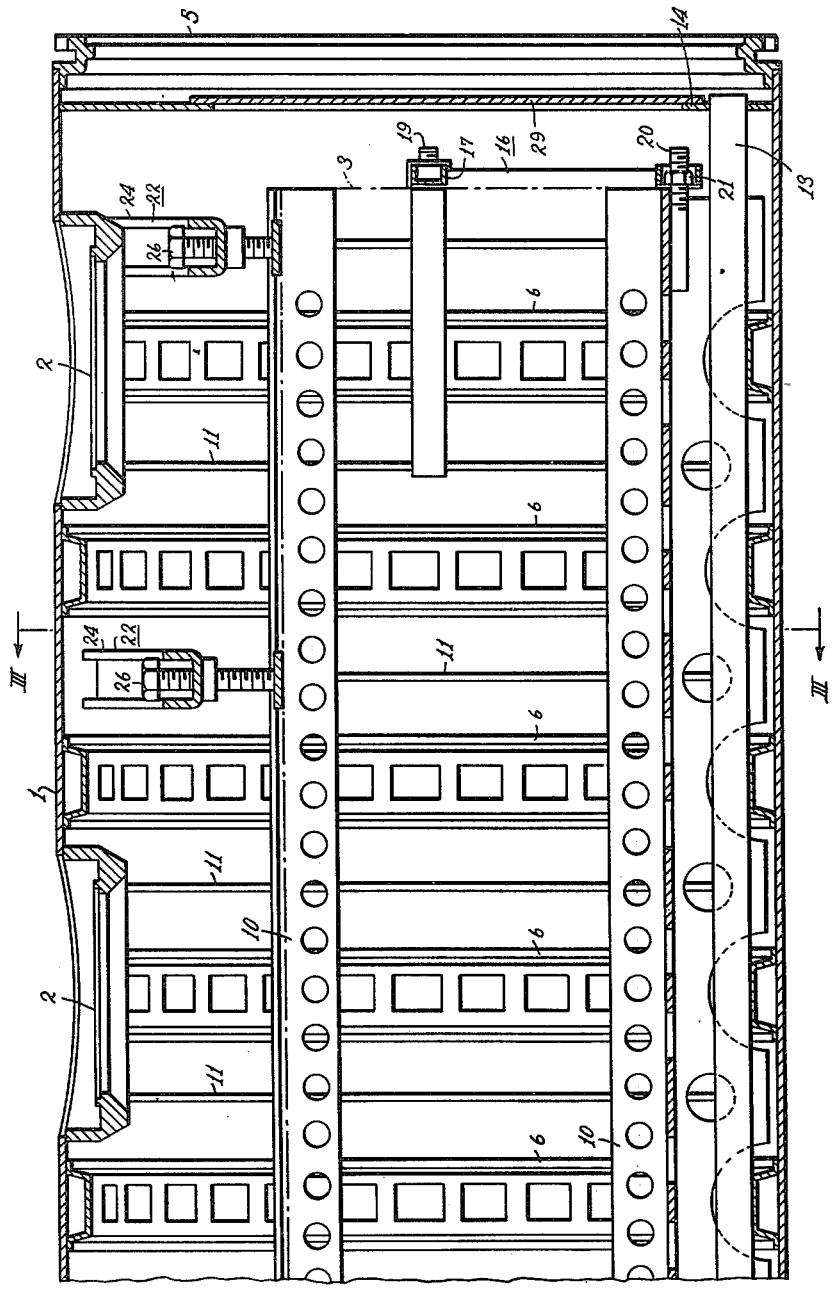

Aug. 24, 1948.   T. A. DALY   2,447,639
TORPEDO BATTERY COMPARTMENT
Filed Nov. 30, 1946   4 Sheets-Sheet 4

WITNESSES:
Edward Michaels
E. F. Oberheim

INVENTOR
Thomas A. Daly.
BY
Paul E. Friedemann
ATTORNEY

Patented Aug. 24, 1948

2,447,639

UNITED STATES PATENT OFFICE 2,447,639

TORPEDO BATTERY COMPARTMENT

Thomas A. Daly, Sharon, Pa., assignor to Westinghouse Electric Corporation, East Pittsburgh, Pa., a corporation of Pennsylvania Application November 30, 1946, Serial No. 713,258

10 Claims. (Cl. 114—20)

This invention relates generally to torpedoes and it has particular reference to certain structural features of an aerial torpedo.

In the science of aerial torpedo warfare as presently known, aerial torpedoes are launched from aircraft specifically adapted for this type of operation. The usual practice is for the torpedo carrying plane to traverse a flight path intercepting the path of its target, this maneuver being performed at altitudes usually ranging from 300 to 400 feet. As the plane approaches the desired range of the target the airspeed is dropped to about 200 to 250 knots and the torpedo is released.

The impact forces acting on the torpedo incident to water entry are high. Accordingly, special consideration must be made in the structural planning of such a weapon that structural failure will not occur upon water entry. With the advent of the all electric torpedo, this consideration became increasingly important because of the use of heavy battery units for power supply purposes and electric motors each of which represents a concentrated mass producing high impact forces under conditions of rapidly changing acceleration as occur at water entry. Additionally all design considerations on the electric torpedo, though the inherent weight was high due to the heavy electrical units, were restricted by established space and weight limitations.

Primarily because of manufacturing considerations requiring importantly among other things, accessibility of components during assembly, the hull of the aerial torpedo is divided into four longitudinal sectional components which are joined by water-tight clamping rings. These sections, proceeding from fore to aft of the assembly, are generally designated in the war shot aerial torpedo, the warhead, which is the forward extremity, the battery compartment, which in most instances in a subdivision thereof houses certain control components for automatic target tracking, the afterbody section which houses additional control components, and the tail cone which carries the propulsion motor and associated shafting, the propellers, the horizontal and vertical rudders and fins together with electromagnetic actuators for the rudders. Of the several sections mentioned this invention is specifically directed to the battery compartment.

A principal object of this invention is to provide a battery compartment for a torpedo which is inherently strong.

Another object of this invention is to provide a battery compartment for a torpedo which is as light in weight as loading conditions permit.

A further object of this invention is to provide a battery compartment for a torpedo into which the battery is easily inserted and secured.

The foregoing objects are merely illustrative of the various aims and objects of this invention. Other objects and advantages will become apparent upon a study of the following disclosure when considered in conjunction with the accompanying drawings, in which:

Figures 1a and 1b taken together illustrate a longitudinal cross-section of a battery compartment for an aerial torpedo embodying the principles of the invention.

Fig. 2 is a sectional view taken on the line II—II of Fig. 1a.

Figure 1A:
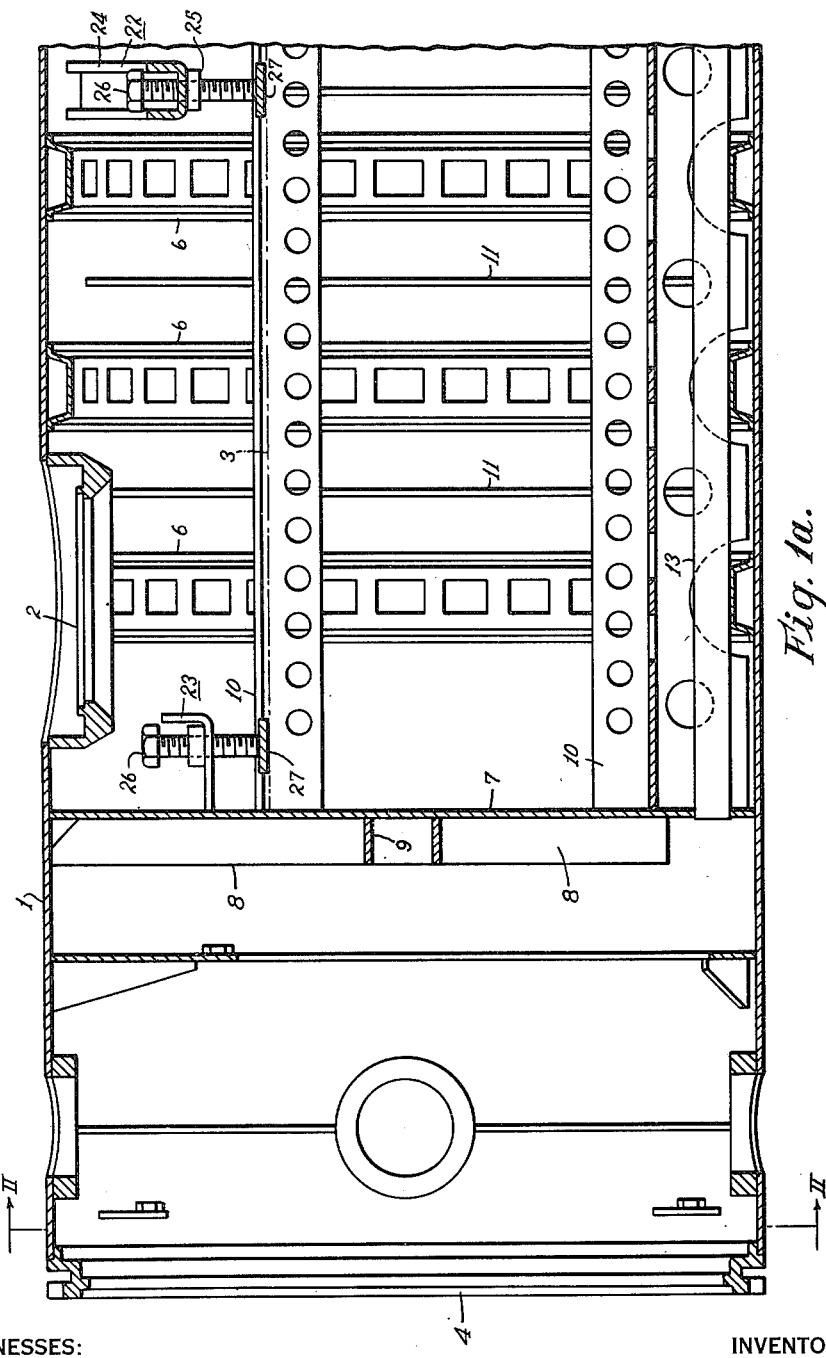
Figure 2:
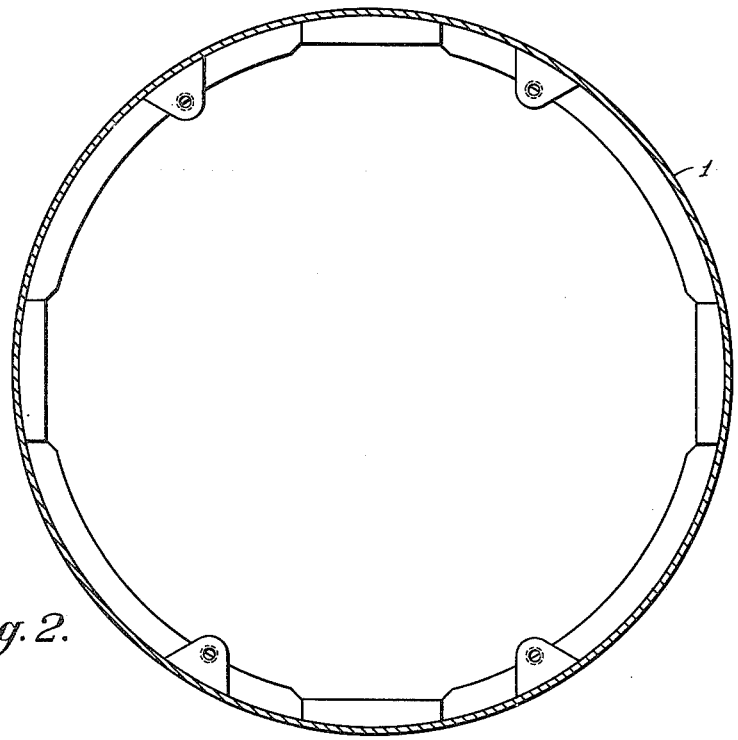

In the drawings, the battery compartment is formed of a rolled sheet metal shell 1 having a circular cross-section, which is provided with suitable openings or handholes 2 giving access to the top side of a battery 3, shown in dot-dash outline, for the purpose of making suitable electrical connections thereto and other adjustments. As illustrated, the handholes are not sealed but it will be understood that suitable cover plates are to be employed to seal the handholes 2. Suitable joint rings 4 and 5, respectively, secured as by welding to the fore and aft extremities of the shell 1 provide means for joining the battery at its forward extremity to a warhead or exercise head (not shown) and at its aft end to an after body section in turn connected with the torpedo tail cone assembly (neither of which is shown).

The shell 1 is stiffened by a plurality of longitudinally spaced circular ribs or rings 6 which are secured internally of the shell and which are formed of a material having a substantially channel-shaped cross-sectional configuration. The forward end of the battery compartment is formed by a bulkhead 7 which is secured, as by a continuous weld, to the shell 1 to form a water-tight or better yet a gas-tight seal therewith, to prevent battery gases from entering the chamber to the left of bulkhead 7, as viewed in Fig. 1a, which may, for instance, be constructed and arranged to house control equipment for automatic tracking. This equipment has not been illustrated since per se it forms no part of this invention and any suitable type may be employed.

Since the overall permissible weight of the torpedo is controlled by its size and the mass of such elements as the battery, motor, warhead and control equipment which is comprised in the assembly is not arbitrarily controlled, it is highly essential that the structural weight of the shell structure be kept at a minimum, while yet affording the required strength, that the limit of negative buoyancy may not be exceeded. To this end most of the structural components have been fabricated of relatively light weight sheet metal formed in suitable shapes and otherwise fabricated to afford optimum weight/strength ratios. In keeping with this design criterion the bulkhead 7 is fabricated of a thin sheet metal section having a plurality of ribs 8 radiating from the central circular section 9 and terminating at the shell 1 where they are secured. This bulkhead receives the forward thrust of the battery due, in part, to slight relative movements between the battery and its support and, in part, to the deflection of the structure which carries the battery, which forward thrust occurs at water entry.

The battery is carried in the longitudinally disposed angle members 10 which are carried by the rib segments 11 secured to the shell 1 between the circular ribs or rings 6. As will be seen in either of Figs. 3 or 5, the rib segments 11 are symmetrically arranged about the vertical cross-sectional centerline of the shell and the chord edge thereof is shaped to a suitable configuration to receive the four angle members 10, the angle members being disposed in suitable relation that they define the corners of a rectangle of suitable size to receive the battery 3. It will also be noted that the center of the rectangle is coincident with the vertical axis of the shell but lies below the horizontal axis. Hence, the center of gravity of the battery lies below the torpedo axis introducing a certain degree of inherent pendulous stability laterally of the torpedo.

An inverted longitudinally disposed channel 12 has the extremities of the channel sides thereof secured along the bottom of the shell 1 symmetrically between the lowermost pair of the four angle members, the upper surface of this channel lying substantially in the plane defined by the horizontal sides of the lowermost pair of the four angle members. It will be apparent that the inverted channel supports the battery centrally thereof along its length. A tubular member 13 extending through the forward bulkhead 7 and an after bulkhead 14 passes through the areaway defined within the inverted channel 12, and is securely sealed to both bulkheads. Tubular member 13 forms a conduit through which suitable wires may be passed (not shown) to connect together the various components of the torpedo's electrical controls.

The battery is secured against significant longitudinal movement in the angle member framework by means of a battery brace 16 which abuts the after extremity of the battery and draws the battery up snugly against the forward bulkhead 7. This brace is formed of a triangular fabrication of channels 17 illustrated in plan form in Fig. 5 and is secured over the threaded extremities of mounting lugs or bars 18, 19 and 20 which pass through holes in the apexes of the triangular brace, which is then secured by nuts 21.

Figure 3:
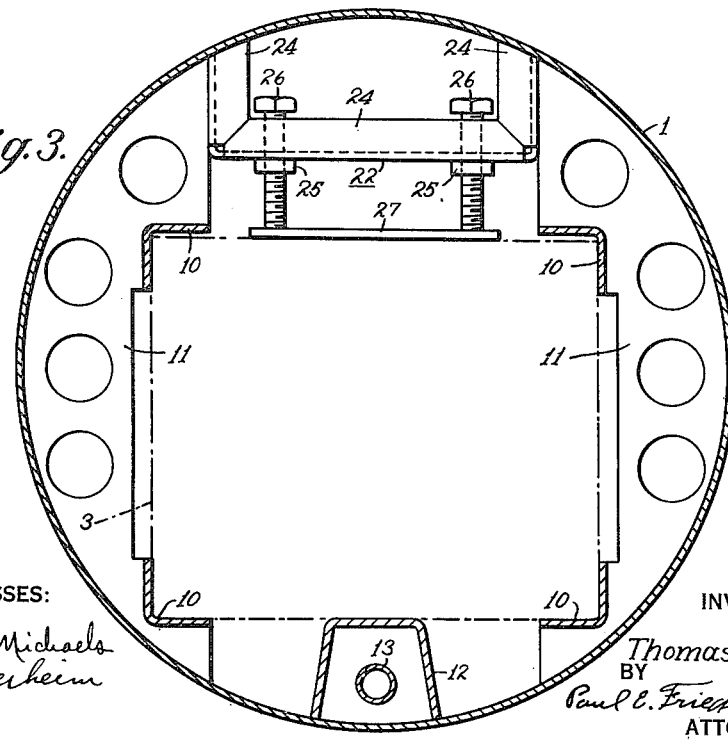
Fig. 3 is a sectional view taken on the line III—III of Fig. 1b.
Figure 4:
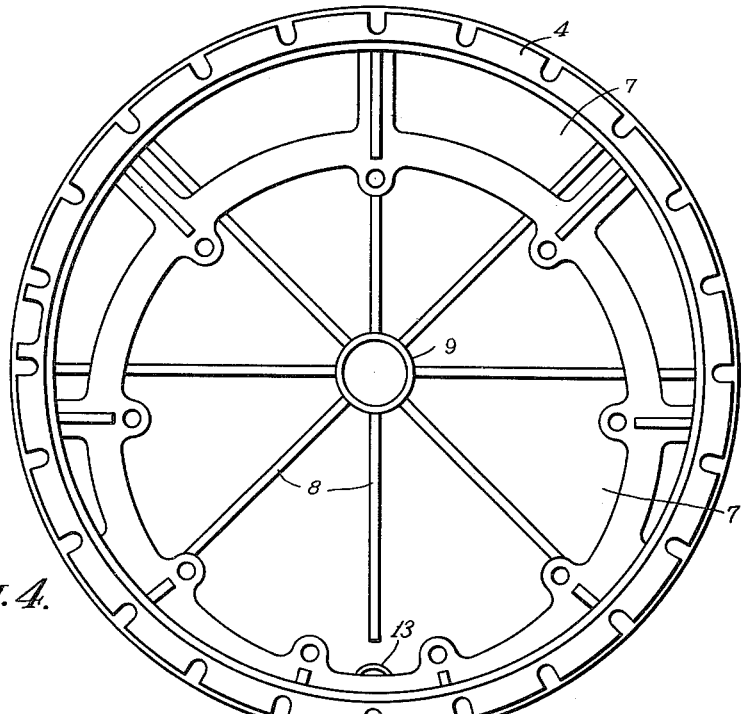
Fig. 4 is a view looking at the forward extremity of that part of the battery compartment of Fig. 1a, that is, the left-hand end of the compartment as viewed in Fig. 1a, and Fig. 5 is a view looking at the aft extremity of that part of the battery compartment of Fig. 1b, that is, the right-hand end of the compartment as viewed with the cover plate which seals the compartment removed.

Lugs 18 and 19 straddle the aftermost two of the rib segments 11 and are secured thereto in horizontally opposed relation as best seen in Fig. 3. Lug 20 is secured internally of the inverted channel 12.

The battery is secured against vertical movement and at the same time by reason of the vertical clamping means against significant lateral movement by means of the clamps 22 which are disposed between certain of the rib segments 11 and a clamp 23 which is anchored to the forward bulkhead and which spans the shell 1 and is anchored thereto at the chord level indicated in Fig. 1a.

Figure 5:
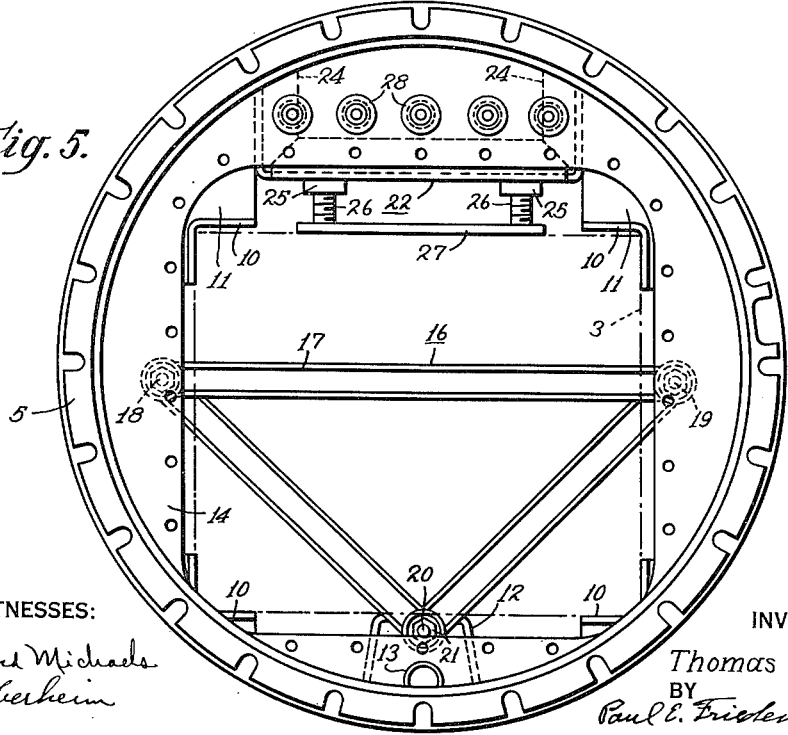

Clamps 22 are fabricated of light channel-shaped metal which is cut and bent to form pads 24 of the U-shaped configuration shown in Figs. 3 and 5. These pads fit between the rib segments 11 and the uppermost pair of angle members 10 at the points indicated, with the extremities thereof abutting the shell 1. They are firmly secured to both the rib segments and the shell. Each of the pads is equipped with a pair of threaded bushings 25 symmetrically disposed about the vertical centerline, which receive the bolts 26 threading therethrough and abutting the pads 27 of the top side of the battery to firmly clamp the battery in a vertical direction. Because of the high frictional forces resulting from the secure clamping and the rigidity of the battery shell which minimizes angular deflection thereof in the cross-sectional plane, together with the fact that the lateral forces at water impact are usually measurably smaller than the longitudinal and vertical forces, it is apparent that movement of the battery laterally is practically obviated.

With the construction described, the battery is inserted through after joint ring 5, through the opening provided in bulkhead 14 into the opening defined by angle members 10, where it is guided and supported throughout its length against the forward bulkhead 7. In its clamped position, it is apparent that the battery load is distributed in increments along the angle members to the respective rib segments 11 and thence over the shell structure 1 in a manner to minimize structural loading or stress concentration at any one point.

When the battery is finally clamped in position, all electrical connections may be made thereto through the access provided by the handholes 2, all the battery connections being brought out of the compartment through suitable snug fitting grommets 28 in the after bulkhead 14. These connections in the actual construction are carried to a distribution panel in the previously mentioned after body section to the rear of the battery compartment from which the various required power supplies are taken, connections from the distribution panel to control equipment forward of the battery compartment being taken through the conduit 13. Prior to the connection of the battery compartment and the after body section at the joint rings the cover plate 29 sealing the opening in the bulkhead 14 is attached.

The foregoing disclosure and the showings made in the drawings are merely illustrative of the principles of this invention and are not to be considered in a limiting sense. The only limitations are to be determined from the scope of the appended claims.

I claim as my invention:

1. A battery compartment for a torpedo for housing and supporting a battery comprising, in combination, a cylindrical sheet metal housing, a plurality of longitudinally spaced ribs secured internally of said housing, a plurality of rib segments secured to said sheet metal housing between said ribs, four longitudinally disposed angles secured to said rib segments, said angles in cross-section defining the corners of a rectangle corresponding in size to the cross-sectional dimension of a battery to be received therein, the center of said rectangle lying in a vertical plane containing the axis of said housing, but being disposed below the said axis, an inverted longitudinally disposed channel member secured to said housing along the bottom thereof and being disposed between the lowermost pair of said four angles to engage and support the said battery along the central bottom longitudinal portion thereof, a forward bulkhead against which the forward extremity of said battery abuts, clamping means arranged in the aft extremity of said compartment for engaging the aft extremity of said battery and imparting a forward bias thereto against said forward bulkhead, and clamping means arranged between the uppermost pair of said four angles for engaging the top side of said battery.

2. A battery compartment for a torpedo for housing and supporting a battery comprising, in combination, a cylindrical sheet metal housing, a plurality of longitudinally spaced ribs secured internally of said housing, a plurality of rib segments secured to said sheet metal housing between said ribs, four longitudinally disposed angles secured to said rib segments, said angles in cross-section defining the corners of a rectangle corresponding in size to the cross-sectional dimension of a battery to be received therein, the center of said rectangle lying in a vertical plane containing the axis of said housing, but being disposed below the said axis, an inverted longitudinally disposed channel member secured to said housing along the bottom thereof and being disposed between the lowermost pair of said four angles to engage and support the said battery along the central bottom longitudinal portion thereof, a forward bulkhead against which the forward extremity of said battery abuts, clamping means arranged in the aft extremity of said compartment for engaging the aft extremity of said battery and imparting a forward bias thereto against said forward bulkhead, clamping means arranged between the uppermost pair of said four angles for engaging the top side of said battery, means for sealing the after extremity of said battery compartment, and means for passing electrical conductors from said battery through said means for sealing the said after extremity.

3. A battery compartment for a torpedo constructed and arranged to house and support a battery comprising, in combination, a cylindrical sheet metal shell, a plurality of longitudinally spaced ribs secured internally of said shell, four longitudinally disposed angle members disposed longitudinally of said ribs and secured at spaced intervals thereto, said angle members being arranged in cross-sectional configuration to define the corners of a rectangle of dimension corresponding to the cross-sectional dimension of said battery, and clamping means for longitudinally securing said battery against movement.

4. A battery compartment for a torpedo constructed and arranged to house and support a battery comprising, in combination, a cylindrical sheet metal shell, a plurality of longitudinally spaced ribs secured internally of said shell, four longitudinally disposed angle members disposed longitudinally of said ribs and secured at spaced intervals thereto, said angle members being arranged in cross-sectional configuration to define the corners of a rectangle of dimension corresponding to the cross-sectional dimension of said battery, a bulkhead disposed adjacent the forward extremity of said shell, and clamping means disposed adjacent the after extremities of said angle members, said clamping means being constructed to bias said battery forwardly against said forward bulkhead.

5. A battery compartment for a torpedo constructed and arranged to house and support a battery comprising, in combination, a cylindrical sheet metal shell, a plurality of longitudinally spaced ribs secured internally of said shell, four longitudinally disposed angle members disposed longitudinally of said ribs and secured at spaced intervals thereto, said angle members being arranged in cross-sectional configuration to define the corners of a rectangle of dimension corresponding to the cross-sectional dimension of said battery, a bulkhead disposed adjacent the forward extremity of said shell, clamping means disposed adjacent the after extremities of said angle members, said clamping means being constructed to bias said battery forwardly against said forward bulkhead, and means for clamping said battery against vertical movement.

6. A battery compartment for a torpedo constructed and arranged to house and support a battery comprising, in combination, a cylindrical shell, a plurality of longitudinally spaced ribs secured internally of said shell, rib segments disposed between said ribs and secured to said shell, four angle members, each disposed longitudinally of said shell and secured to said rib segments in such relation that the angles define the corners of a rectangle whose center lies below the center of said cylindrical shell, a bulkhead forming a water-tight seal with said shell, disposed at the forward extremities of said angle members, a pair of longitudinally disposed bars having threaded after extremities, said bars being secured to at least two of the aftermost of said rib segments, and arranged in horizontally opposed relation; and a bar having holes in the extremities thereof for receiving the after threaded extremities of said longitudinally disposed bars and to be secured thereto by nuts threading over said threaded after extremities of said bars.

7. A battery compartment for a torpedo constructed and arranged to house and support a battery comprising, in combination, a cylindrical shell, a plurality of longitudinally spaced ribs secured internally of said shell, rib segments disposed between said ribs and secured to said shell, four angle members, each disposed longitudinally of said shell and secured to said rib segments in such relation that the angles define the corners of a rectangle whose center lies below the center of said cylindrical shell, a bulkhead forming a water-tight seal with said shell, disposed at the forward extremities of said angle members, a pair of longitudinally disposed bars having threaded after extremities, said bars being secured to at least two of the aftermost of said rib segments, and arranged in horizontally opposed relation; a bar having holes in the extremities thereof for receiving the after threaded extremities of said longitudinally disposed bars and to be secured thereto by nuts threading over said threaded after extremities of said bars, and clamping means secured to said housing between the uppermost pair of said four angle members.

8. A battery compartment for a torpedo constructed and arranged to house and support a battery comprising, in combination, a cylindrical shell, a plurality of longitudinally spaced ribs secured internally of said shell, rib segments disposed between said ribs and secured to said shell, four angle members, each disposed longitudinally of said shell and secured to said rib segments in such relation that the angles define the corners of a rectangle whose center lies below the center of said cylindrical shell, a bulkhead forming a water-tight seal with said shell, disposed at the forward extremities of said angle members, a pair of longitudinally disposed bars having threaded after extremities, said bars being secured to at least two of the aftermost of said rib segments, and arranged in horizontally opposed relation; a bar having holes in the extremities of said longitudinally disposed bars and to be secured thereto by nuts threading over said threaded after extremities of said bars, supporting means secured between oppositely disposed pairs of said rib segments and the upper inner side of said shell, and clamping means associated with said supporting means.

9. A battery compartment for a torpedo constructed and arranged to house and support a battery comprising, in combination, a cylindrical shell, a plurality of longitudinally spaced ribs secured internally of said shell, rib segments disposed between said ribs and secured to said shell, four angle members, each disposed longitudinally of said shell and secured to said rib segments in such relation that the angles define the corners of a rectangle whose center lies below the center of said cylindrical shell, a bulkhead forming a water-tight seal with said shell, disposed at the forward extremities of said angle members, a pair of longitudinally disposed bars having threaded after extremities, said bars being secured to at least two of the aftermost of said rib segments, and arranged in horizontally opposed relation; a bar having holes in the extremities of said longitudinally disposed bars and to be secured thereby by nuts threading over said threaded after extremities of said bars, supporting means secured between oppositely disposed pairs of said rib segments and the upper inner side of said shell, clamping means associated with said supporting means, and a longitudinally disposed support secured to said shell between lowermost pair of said angle members and having the upper surface thereof lying in the plane defined by the horizontal sides of said angle members.

10. A battery compartment for a torpedo constructed and arranged to house and secure a battery comprising, in combination, a cylindrical shell, a plurality of longitudinally spaced circular ribs secured internally of said shell, rib segments disposed between said circular ribs and secured to said shell, four angle members disposed longitudinally of said shell and secured to said shell, four angle members disposed longitudinally of said shell and secured to said rib segments in such relation that the angles define the corners of a rectangle whose center lies below the center of said cylindrical shell, a bulkhead forming a water-tight seal with said shell, disposed at the forward extremities of said angle members, a pair of longitudinally disposed bars, said bars being secured in horizontally opposed relation to at least the two aftermost of the said rib segments and having the after extremities thereof protruding in an aftward direction beyond the after extremities of said four angle members, a longitudinally disposed support secured internally along the bottom of said shell between the lowermost pair of the four angle members, with the upper surface thereof lying in the plane defined by the horizontal sides of the lowermost pair of angle members, a bar protruding from said longitudinally disposed support and terminating approximately in the plane of the said horizontally opposed bars, said bars in cross section defining a triangle, and a triangular member constructed to fit over and to be secured to the protruding portions of said bars.

THOMAS A. DALY.